US012576894B2

(12) United States Patent
Mattioli

(10) Patent No.: US 12,576,894 B2
(45) Date of Patent: Mar. 17, 2026

(54) LASER ALIGNMENT SYSTEM FOR RAILCAR MOVER AND METHOD OF USE

(71) Applicant: Zephir S.p.A., Modena (IT)

(72) Inventor: Marco Mattioli, Modena (IT)

(73) Assignee: Zephir S.p.A., Modena (IT)

( * ) Notice: Subject to any disclaimer, the term of this patent is extended or adjusted under 35 U.S.C. 154(b) by 676 days.

(21) Appl. No.: 17/992,156

(22) Filed: Nov. 22, 2022

(65) Prior Publication Data

US 2023/0159068 A1     May 25, 2023

Related U.S. Application Data

(60) Provisional application No. 63/281,982, filed on Nov. 22, 2021.

(51) Int. Cl.
B61K 9/12         (2006.01)
B60F 1/00         (2006.01)
G01B 11/26        (2006.01)

(52) U.S. Cl.
CPC .................. B61K 9/12 (2013.01); B60F 1/00 (2013.01); G01B 11/26 (2013.01)

(58) Field of Classification Search
CPC .... B61K 9/12; B61K 5/00; B61K 9/08; B61B 5/02; B60F 1/04; B60F 1/00
See application file for complete search history.

(56) References Cited

U.S. PATENT DOCUMENTS

| | | | | | |
|---|---|---|---|---|---|
| 7,036,232 | B2 * | 5/2006 | Casagrande | ............. | B61K 9/08 |
| | | | | | 33/651 |
| 7,715,026 | B2 * | 5/2010 | Nayebi | .................... | B61K 9/12 |
| | | | | | 356/625 |
| 8,081,320 | B2 * | 12/2011 | Villar | ........................ | B61K 9/08 |
| | | | | | 356/606 |
| 9,860,962 | B2 * | 1/2018 | Mesher | ..................... | B61K 9/08 |
| 10,518,791 | B2 * | 12/2019 | Singh | ..................... | G06F 18/251 |
| 2013/0313372 | A1 * | 11/2013 | Gamache | ................. | B61K 9/12 |
| | | | | | 246/169 D |
| 2015/0115109 | A1 * | 4/2015 | Gamache | ................. | B61K 9/12 |
| | | | | | 246/169 D |
| 2023/0204394 | A1 * | 6/2023 | Francke | .................... | B61K 9/08 |
| | | | | | 73/431 |

FOREIGN PATENT DOCUMENTS

DE         102016008487 A1 *   1/2018   ............... B61K 5/00

OTHER PUBLICATIONS

International Search Report dated Feb. 21, 2023 issued in PCT/IB2022/061287.

* cited by examiner

*Primary Examiner* — Cheng Lin
(74) *Attorney, Agent, or Firm* — Arnold & Porter Kaye Scholer LLP

(57)         ABSTRACT

A laser alignment system for a railcar mover is disclosed herein. The laser alignment system may comprise a laser mounted to a frame of a railcar mover that assists with the alignment of a rail wheel and the rail of a track when switching from road mode to rail mode. In various embodiments, the laser may be mounted to the frame of the railcar mover via a mount and/or mounting structure that enable the laser to be moved and/or the orientation of the laser to be adjusted relative to the railcar mover. In some embodiments, the laser alignment system may include a window underneath the operator of the railcar mover so that a laser beam emitted by the laser can be seen by the operator.

15 Claims, 6 Drawing Sheets

110

120

121

122

602 — POSITION RAILCAR MOVER ABOVE RAIL

604 — ACTIVATE LASER ALIGNMENT SYSTEM

606 — ALIGN RAIL WHEEL WITH RAIL USING LASER ALIGNMENT SYSTEM

608 — LOWER RAIL WHEEL ONTO TRACK

LASER ALIGNMENT SYSTEM FOR RAILCAR MOVER AND METHOD OF USE

RELATED APPLICATIONS

This application claims priority to U.S. Provisional Patent Application No. 63/281,982 filed Nov. 22, 2021, the content of which is incorporated herein by reference in its entirety.

FIELD OF THE INVENTION

The present invention relates to the railway industry and, more particularly, to systems for aligning rail wheels on a railcar mover with a track.

BACKGROUND OF THE INVENTION

A railcar mover is a machine capable of traveling on both roads and rail tracks to efficiently move railcars. The ability to also move on roads allows the railcar mover to maneuver around a rail yard without a need for a clear path to rails cars that need to be moved. Once at a desired destination, a railcar mover must shift from road mode to rail mode—which places the rail wheels on the track—before it can move the railcars.

The transition from road mode to rail mode requires the operator of the railcar mover to manually align the rail wheels and the track before lowering the machine onto the rails. A number of different standard railway track gauges are utilized by different railway systems based on the country or geographic region in which the railway system is located. The use of different standard railway track gauges makes the task of aligning the rail wheels with the track more difficult.

When the operator is unable to successfully align the rail wheel and the track, the rail wheel will not correctly engage with the track, which can damage the railcar mover and/or track. The conventional method of relying on the operator's ability to manually align the rail wheels and the track is inefficient and potentially hazardous. As such, there is a need for a better way to align the rail wheels of railcar movers with the track.

SUMMARY OF THE INVENTION

Aspects of this disclosure relate to a laser alignment system for engaging a rail wheel of a railcar mover with a rail. The laser alignment system may comprise a laser mounted to a frame of a railcar mover that assists with the alignment of a rail wheel and the rail of a track when switching from road mode to rail mode. In various embodiments, the laser may be mounted to the frame of the railcar mover via a mount and/or mounting structure that enable the laser to be moved and/or the orientation of the laser to be adjusted relative to the railcar mover. In some embodiments, the laser alignment system may include a window underneath the operator of the railcar mover so that a laser beam emitted by the laser can be seen by the operator.

In various embodiments, the laser may be configured to emit a laser onto a rail wheel of the railcar mover and/or a rail underneath the railcar mover to which the railcar mover is to be engaged. In some embodiments, a laser alignment system for a railcar mover may have two or more lasers each configured to emit a laser beam onto a separate rail wheel of the railcar mover and a rail of the track upon which the rail wheel is being lowered. In some implementations, the laser alignment system (and its laser) may be activated by pressing a switch located within the railcar. In some implementations, the laser alignment system may be automatically activated or deactivated when the railcar mover switches from rail mode to road mode or from road mode to rail mode. For example, in some implementations, the laser alignment system may be automatically deactivated responsive to the railcar mover switching from road mode to rail mode.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized, and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three-dimensional orientation of structures in order to fall within the scope of this invention.

Railcar movers are machines capable of operation in road mode and rail mode. In road mode, the railcar mover utilizes a set of road wheels to drive freely. In rail mode, the railcar mover utilizes a set of rail wheels that engage the rail of a train track to move along the track. The invention described herein relates to a laser alignment system that improves the function and efficiency of a railcar mover by more efficiently and accurately aligning the rail wheel and rail of a train track when shifting from road mode to rail mode.

Figure 1:
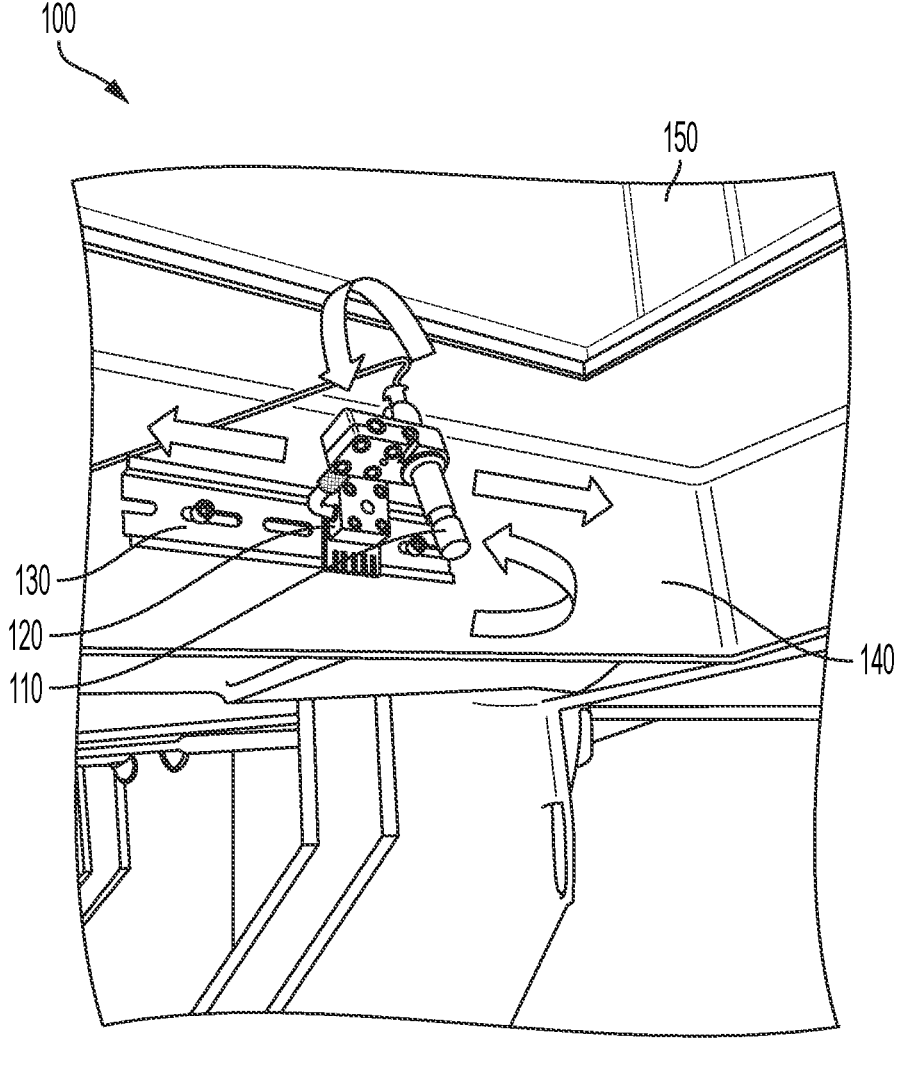
FIG. 1 depicts a perspective view of an example laser alignment system, according to one or more aspects described herein.

For example, FIG. 1 depicts a perspective view of a laser alignment system 100, according to one or more aspects described herein. The laser alignment system described herein is configured to enable alignment of the rail wheel and the rail of a track when switching from road mode to rail mode. The laser alignment system 100 comprises a laser 110 mounted to a frame 140 of a railcar mover via a first mount 120 and/or a second mounting structure 130. In various embodiments, laser 110 may be mounted to frame 140 of a railcar mover via first mount 120 attached to second mounting structure 130. In various embodiments, second mounting structure 130 may be installed directly on a frame of a railcar mover. In various embodiments, first mount 120 may be affixed to second mounting structure 130. In various embodiments, the first mount 120 allows the laser alignment system 100 to adjust the aim of the laser 110 in a rotational manner as required for alignment, while the second mounting structure 130 functions with the first mount 120 to allow the laser alignment system to move in a side-to-side manner as required for alignment. For example, in some embodiments, first mount 120 may comprise a flexible component configured to rotate, swivel, or be otherwise manipulated to adjust and/or establish an orientation of laser 110 relative to the railcar mover. In some embodiments, a location of laser 110 may be adjusted by adjusting the position of first mount 120 on second mounting structure 130. For example, second mounting structure 130 may enable first mount 120 to be moved from side-to-side on second mounting structure 130 by loosening one or more screws, sliding first mount 120 laterally along second mounting structure 130, and tightening the one or more screws to affix first mount 120 in a new position. In various embodiments, second mounting structure 130 may be affixed to or installed directly on the frame 140 of the railcar mover. Accordingly, laser 110 may be affixed to the railcar mover via first mount 120 and second mounting structure 130. Additionally, the frame 140 and/or a floor underneath an operator of the railcar mover may comprise a window 150 so the laser beam 160 emitted by the laser alignment system 100 can be seen by an operator of the railcar mover.

Figure 2B:
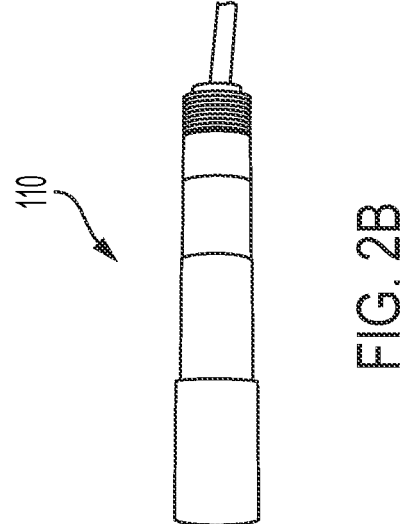
FIG. 2B depicts an example laser for use in a laser alignment system, according to one or more aspects described herein.
Figure 2A:
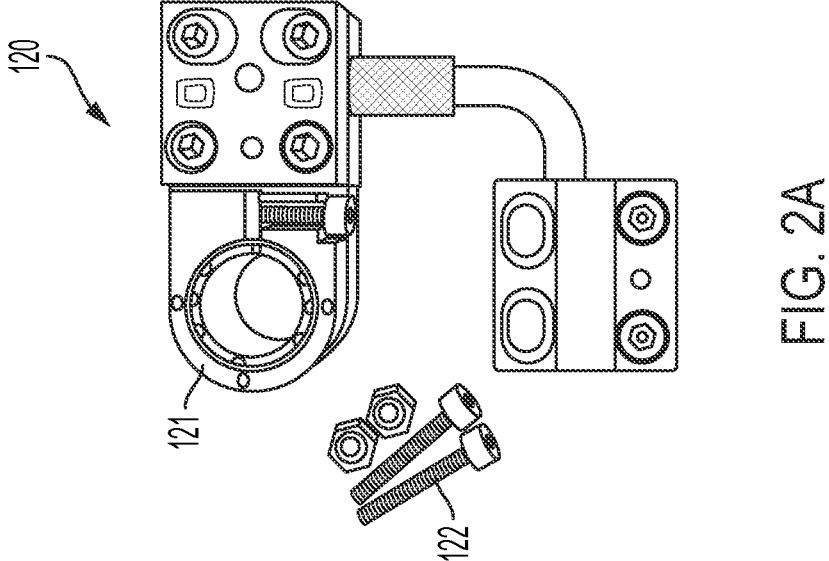
FIG. 2A depicts an example mount for mounting a laser, according to one or more aspects described herein.

FIG. 2A depicts a laser mount that can be used as the first mount 120 of the laser alignment system 100, according to one or more aspects described herein. The first mount 120 may comprise an opening 121 for mounting of the laser 110. The first mount 120 may also comprise screws 122 for mounting the first mount 120 to the second mounting structure 130. The first mount 120 may be adjustable so that laser 110 may be calibrated and adjusted as required to facilitate alignment.

FIG. 2B depicts a laser that can be used as the laser 110 of the laser alignment system 100, according to one or more aspects described herein. In various embodiments, laser 110 may be configured to emit a laser beam onto a rail of a track. While the laser depicted is round, any shape laser can be used. For example, in some embodiments, the laser 110 may comprise a Class 2 laser that emits visible light, between 380 nm and 700 nm. In other embodiments, other types of lasers or light may be used. In some embodiments, laser 110 may preferably emit green light, as green light has better visibility in high light conditions when compared to red light, which can additionally be associated with danger or alarm. However, one or more other different types of lasers may be used for laser 110. In some embodiments, the laser 110 may be powered by a 24V power supply, of which the power supply can optionally be integral to the railcar mover. However, one or more other types of sources of power may be used to power the laser 110. In some embodiments, the laser alignment system 100 can be configured to only be active in road mode. For example, Additionally, the laser alignment system 100 may be controlled by a switch. In some embodiments, the switch may comprise an instable switch that requires the operator to actively press the switch to produce a laser beam 160.

Figure 3:
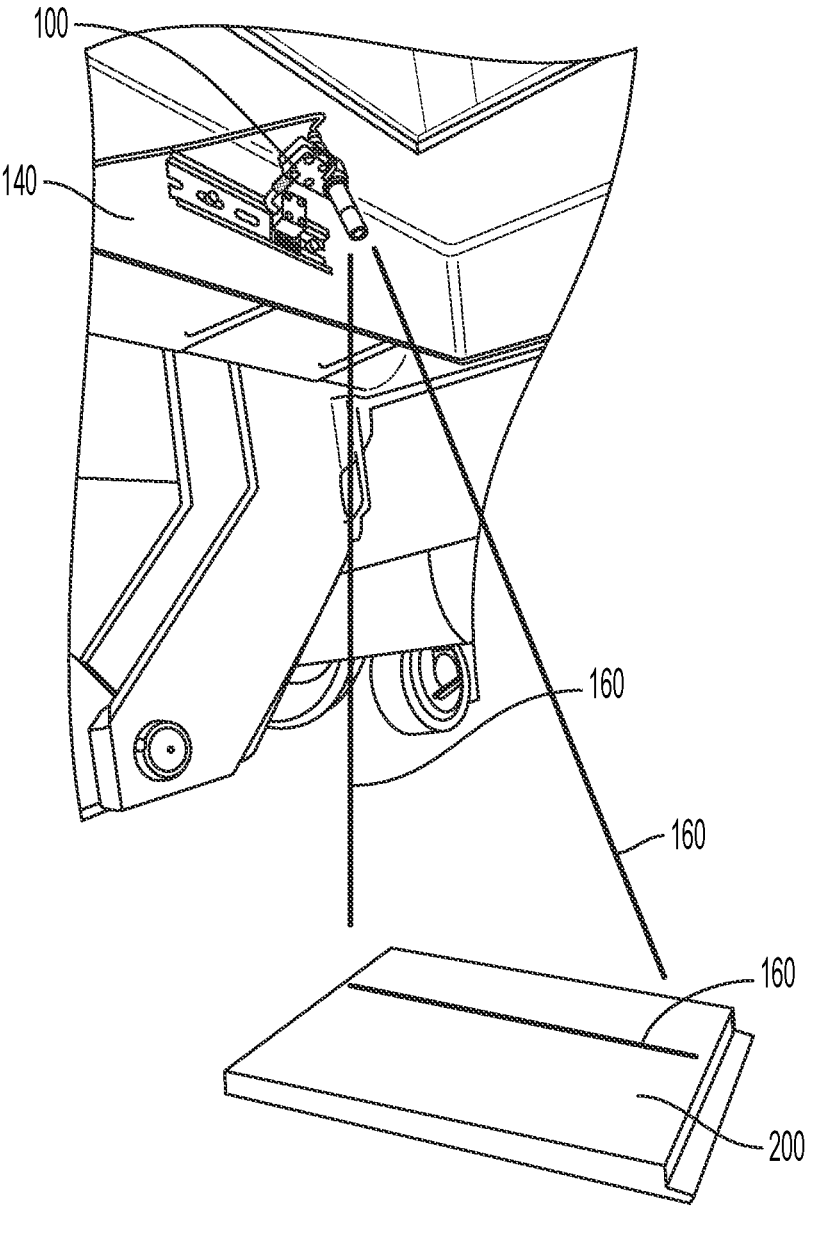
FIG. 3 depicts a perspective view of an example laser alignment system emitting a laser beam, according to one or more aspects described herein.

FIG. 3 depicts a perspective view of the laser alignment system 100 mounted to the frame 140 of the railcar mover, according to one or more aspects described herein. In some embodiments, the laser alignment system is configured to produce a laser beam 160 onto a surface 200. In some embodiments, laser beam 160 may be green in color. Utilizing this second surface 200, the laser alignment system 100 may be adjusted to point the laser beam 160 at a desired angle to represent where a rail and rail wheel should align. In various embodiments, surface 200 may comprise (or represent) a portion of a track onto which a rail wheel of a railcar mover is being lowered.

Figure 4:
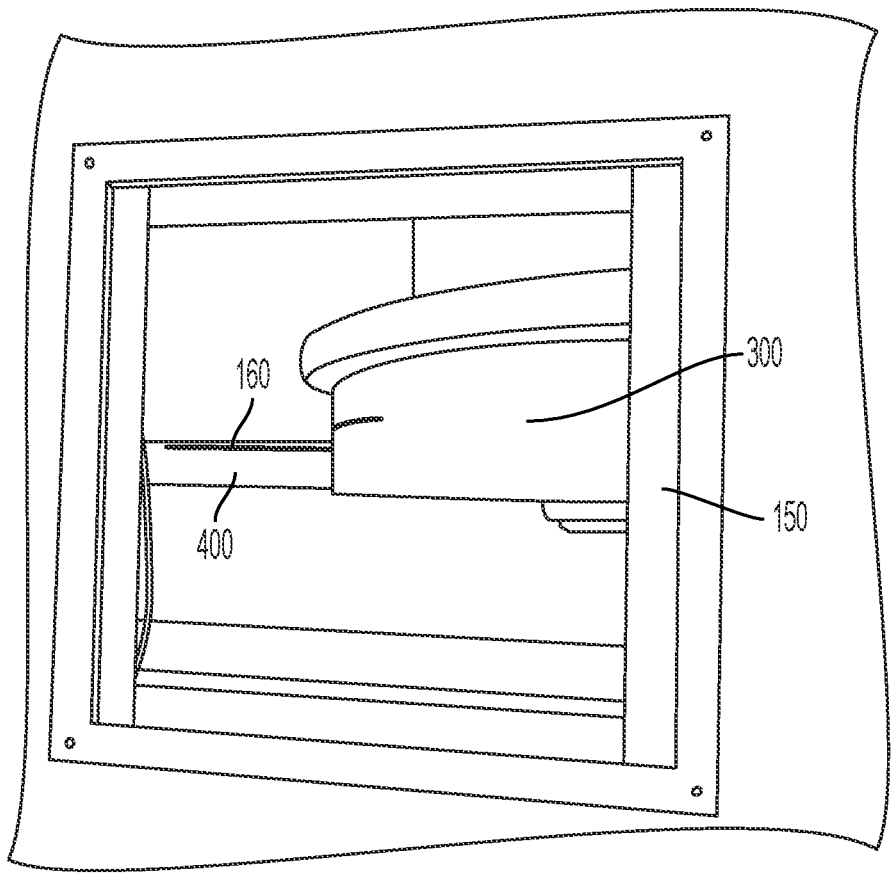
FIG. 4 depicts a perspective view of a laser beam of an example laser alignment system aligning a rail wheel and rail, according to one or more aspects described herein.

FIG. 4 depicts a perspective view looking through the window 150 in the frame 140 of the railcar mover, according to one or more aspects described herein. In various embodiments, laser 110 may be configured to emit a laser beam 160 onto the rail wheel 300 and the track 400 to ensure alignment. For example, in various embodiments, the railcar mover may include window 150 in the frame 140 of the railcar mover through which the laser beam emitted by laser 110 is visible to an operator of the railcar.

Figure 5:
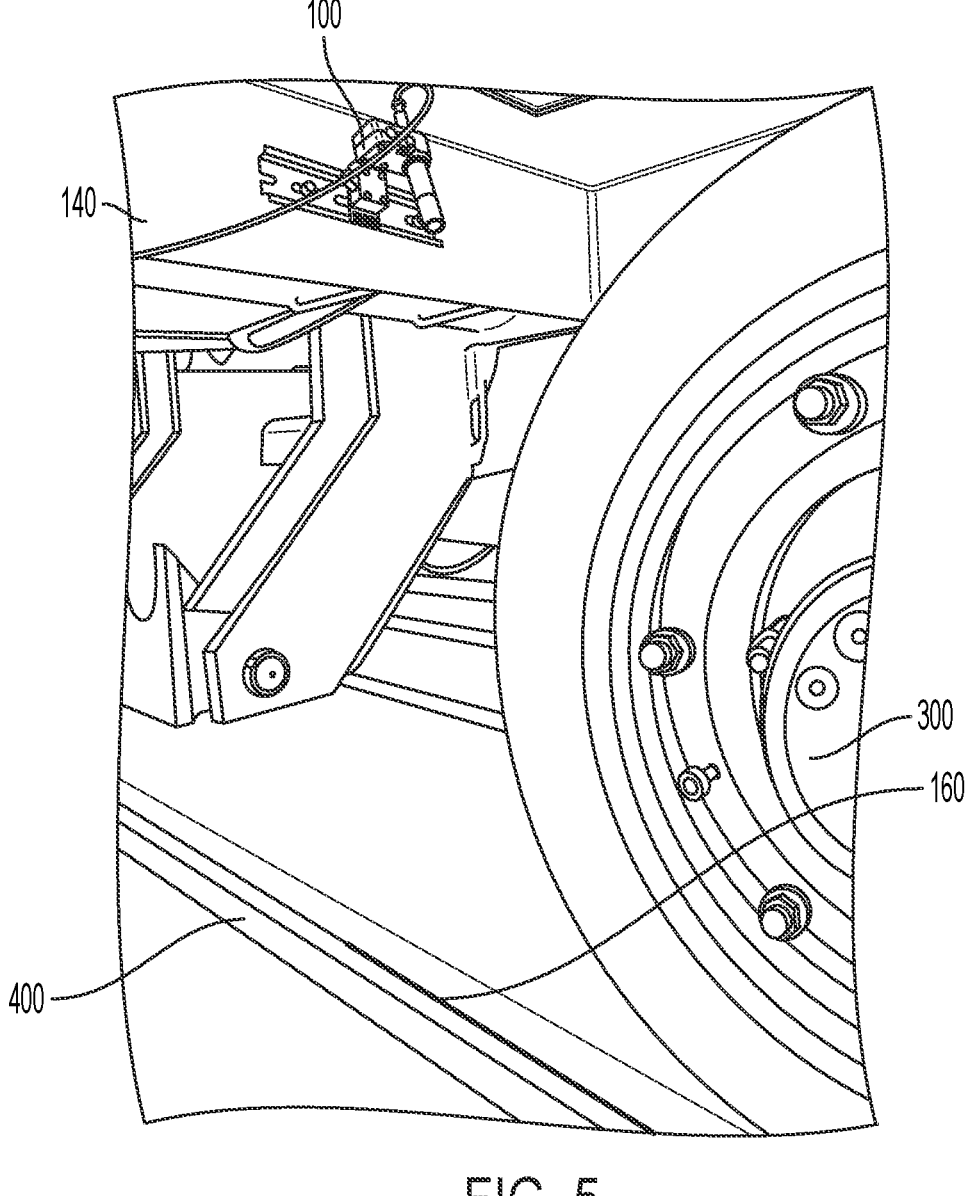
FIG. 5 depicts a perspective view of an example laser alignment system emitting a laser beam onto a rail wheel and rail; according to one or more aspects described herein.

FIG. 5 depicts another perspective view of the laser alignment system 100 mounted to the frame 140 of the railcar mover, wherein the laser beam 160 is emitted onto the rail wheel 300 and track 400 to show alignment, according to one or more aspects described herein.

In some embodiments, a railcar mover may be fitted with multiple laser alignment systems 100 to improve alignment by ensuring wheels on multiple sides of the railcar mover are aligned with the track. For example, in some embodiments, a railcar mover may have two or more lasers 110 each configured to emit a laser beam onto a separate rail wheel of the railcar mover and a rail of the track upon which the rail wheel is being lowered. A railcar mover fitted with multiple laser alignment systems can show improved alignment and parallelism with the rail track.

In order to utilize the laser alignment system 100 of the present invention, the laser alignment system 100 may be calibrated prior to use in the field. This calibration comprises adjusting the first mount 120 and the second mounting structure 130 such that the laser alignment system 100 is attached to the frame 140 of the railcar mover, and that the laser beam 160 emitted by the laser 110 shines in a position that aligns a rail wheel 300 of the railcar mover and a track 400. When the laser alignment system 100 is calibrated in this manner, the operator of the railcar mover may engage the laser alignment system 100, look at the track 400 (optionally through a window 150 in a frame 140 of the railcar mover), verify the laser beam 160 is shining along the track 400 (as shown in FIG. 4), and then change the railcar mover from road mode to rail mode.

Figure 6:
FIG. 6 depicts a flow diagram of an example method for using a laser alignment system to engage rail wheels of a railcar mover with a rail, according to one or more aspects described herein.
Figure 6:
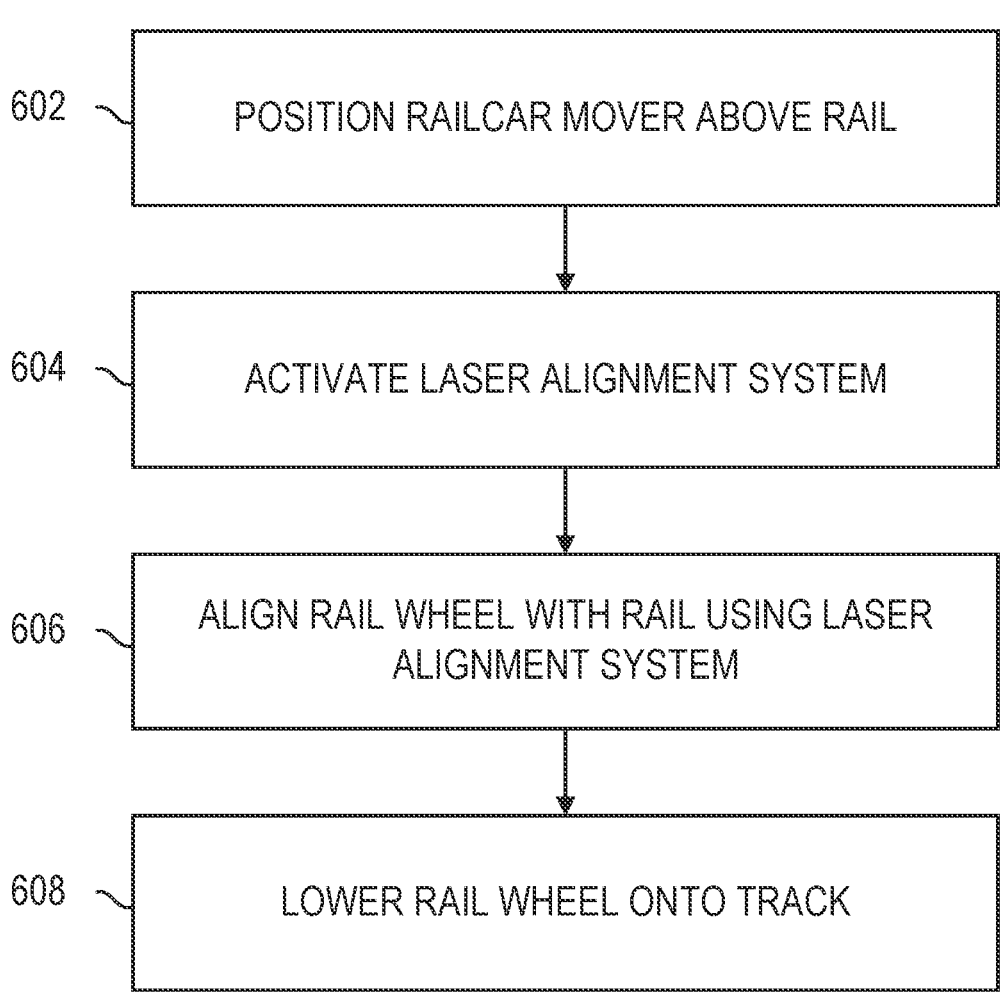

FIG. 6 depicts a flow diagram of an example process 600 for using laser alignment system 100 to engage rail wheels of a railcar mover with a rail, according to one or more aspects described herein. In an operation 602, process 600 may include positioning a railcar mover above a rail. In some implementations, the orientation of a laser relative to the railcar mover may be adjusted by manipulating a flexible component of a mount via which the laser is mounted to the railcar mover.

In an operation 604, process 600 may include activating a laser alignment system comprising a laser mounted to a frame of the railcar mover. In various implementations, the laser is configured to emit a laser beam onto a rail wheel of the railcar mover and the rail. In various implementations, activating the laser alignment system may comprise activating (or turning on) the laser. In some implementations, the laser alignment system may be activated by pressing a switch located within the railcar. In some implementations, the switch may comprise an instable switch that must be pressed and held to activate the laser alignment system. In some implementations, the laser alignment system may be automatically activated or deactivated when the railcar mover switches from rail mode to road mode or from road mode to rail mode. For example, in some implementations, the laser alignment system may be automatically deactivated responsive to the railcar mover switching from road mode to rail mode. In an operation 606, process 600 may include aligning the rail wheel with the rail using the laser alignment system. In various implementations, aligning the rail wheel of the railcar mover with the rail may comprise viewing the laser beam emitted onto the rail wheel and the rail via a window in the frame of the railcar mover. In an operation 608, process 600 may include lowering rail wheel to engage the rail.

The laser alignment system of the present invention can improve the efficiency at which the operator is able to transition the railcar mover from road mode to rail mode, while also reducing the risk of injury and damage to the railcar mover from misalignment of the rail wheel and the track.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

While the preferred embodiments of the invention have been shown and described, one skilled in the relevant art will recognize that numerous variations and modifications may be made to the examples described above without departing from the scope of the present disclosure. Thus, the spirit of the invention should be construed broadly as set forth in the appended claims.

What is claimed is:

1. A laser alignment system for a railcar mover comprising:
    a mounting structure installed on a frame of a railcar mover;
    a mount affixed to the mounting structure;
    a laser configured to emit a laser beam onto a rail of a track; and
    a window in the frame of the railcar mover through which the laser beam emitted by the laser is visible to an operator of the railcar,
    wherein the laser is mounted to the railcar mover via the mount and the mounting structure, wherein the mount comprises a flexible component configured to be manipulated to adjust an orientation of the laser relative to the railcar mover, wherein the laser is configured to emit the laser beam onto a rail wheel of the railcar mover and the rail of the track.

2. The laser alignment system of claim 1, wherein a position of the laser is adjustable by adjusting a position of the mount on the mounting structure.

3. The laser alignment system of claim 1, wherein the laser is configured to emit visible light between 380 and 700 nm.

4. The laser alignment system of claim 1, wherein the laser is powered by a power supply of the railcar mover.

5. The laser alignment system of claim 1, further comprising a switch located within the railcar, wherein the switch is configured to be pressed by the operator of the railcar to activate and deactivate the laser.

6. The laser alignment system of claim 5, wherein the switch comprises an instable switch that requires the operator of the railcar to actively press the switch to activate the laser.

7. The laser alignment system of claim 1, wherein the railroad mover is configured to operate in road mode and rail mode, wherein the railcar mover is configured to travel via road in road mode and travel via rail in rail mode, wherein the laser is only active in road mode.

8. The laser alignment system of claim 1, further comprising a plurality of lasers each mounted to the railcar mover via a mount and a mounting structure.

9. The laser alignment system of claim 8, wherein the plurality of lasers include at least two lasers, wherein each of the at least two lasers is configured to emit a laser beam onto a separate rail wheel of the railcar mover and a rail of the track.

10. A method for engaging a rail wheel of a railcar mover with a rail using a laser alignment system, the method comprising:
    positioning a railcar mover above a rail;
    activating a laser alignment system comprising a laser mounted to a frame of the railcar mover, wherein the laser is configured to emit a laser beam onto a rail wheel of the railcar mover and the rail;
    aligning the rail wheel with the rail using the laser alignment system; and
    lowering rail wheel to engage the rail.

11. The method of claim 10, wherein aligning the rail wheel of the railcar mover with the rail comprises viewing the laser beam emitted onto the rail wheel and the rail via a window in the frame of the railcar mover.

12. The method of claim 10, wherein the laser is mounted to the railcar mover via a mount comprising a flexible component, the method further comprising:

manipulating the flexible component to adjust an orientation of the laser relative to the railcar mover.

13. The method of claim 10, wherein activating the laser alignment system comprises pressing a switch located within the railcar.

14. The method of claim 13, wherein the switch comprises an instable switch, wherein activating the laser alignment system comprises pressing and holding the switch.

15. The method of claim 10, wherein the laser alignment system is automatically deactivated responsive to the railcar mover switching from road mode to rail mode.

* * * * *